United States Patent
Lee et al.

(10) Patent No.: US 9,129,435 B2
(45) Date of Patent: Sep. 8, 2015

(54) METHOD FOR CREATING 3-D MODELS BY STITCHING MULTIPLE PARTIAL 3-D MODELS

(71) Applicant: FUJI XEROX CO., LTD., Minato-ku, Tokyo (JP)

(72) Inventors: David Lee, San Francisco, CA (US); Donald Kimber, Foster City, CA (US); James Vaughan, Mountain View, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 306 days.

(21) Appl. No.: 13/705,013

(22) Filed: Dec. 4, 2012

(65) Prior Publication Data
US 2014/0152660 A1    Jun. 5, 2014

(51) Int. Cl.
G06T 11/60    (2006.01)
G06T 19/20    (2011.01)
G06T 3/40    (2006.01)
G06T 7/00    (2006.01)

(52) U.S. Cl.
CPC ............ *G06T 19/20* (2013.01); *G06T 3/4038* (2013.01); *G06T 7/0065* (2013.01); *G06T 11/60* (2013.01); *G06T 2207/10016* (2013.01); *G06T 2207/10028* (2013.01); *G06T 2207/20076* (2013.01); *G06T 2219/2004* (2013.01)

(58) Field of Classification Search
USPC ......................................... 606/53
See application file for complete search history.

(56) References Cited

U.S. PATENT DOCUMENTS

| | | | |
|---|---|---|---|
| 8,224,064 B1 * | 7/2012 | Hassebrook et al. | 382/154 |
| 2004/0147927 A1 * | 7/2004 | Tsougarakis et al. | 606/53 |
| 2007/0171220 A1 * | 7/2007 | Kriveshko | 345/419 |
| 2009/0092285 A1 * | 4/2009 | Keyes et al. | 382/103 |
| 2012/0158369 A1 * | 6/2012 | Bachrach et al. | 703/1 |
| 2013/0329020 A1 * | 12/2013 | Kriveshko et al. | 348/50 |
| 2014/0015827 A1 * | 1/2014 | Rapoport et al. | 345/419 |

OTHER PUBLICATIONS

Levoy, M., et al., "The digital Michelangelo project: 3D scanning of large statues", Proc. SIGGRAPH 2000, pp. 1-14.
Snavely, N., et al., "Photo tourism: Exploring photo collections in 3D," ACM Transactions on Graphics (SIGGRAPH Proceedings), 25(3), 2006, pp. 835-846.
Agarwal, S., et al.,"Building Rome in a Day", International Conference on Computer Vision, 2009, Kyoto, Japan.
(Continued)

*Primary Examiner* — Phi Hoang
(74) *Attorney, Agent, or Firm* — Sughrue Mion, PLLC

(57) ABSTRACT

A method of creating a 3-D model by capturing partial 3-D models each comprising a sequence of 2-D images, analyzing each of the partial 3-D models to identify image features in the sequence of 2-D images of each of the partial 3-D models, identifying pairs of overlapping image features between the 2-D mages of each of the partial 3-D models by identifying image features in each 2-D image in the sequence of 2-D images of each of the partial 3-D models that overlaps image features in 2-D images of the sequence of 2-D images of the other partial 3-D models and selecting a 2-d image from each of the partial 3-D models, computing an initial transformation between 3-D coordinates of individual pairs of identified image features between the selected 2-D image from each of the partial 3-D models; and generating a final 3-D model based on the initial transformation.

21 Claims, 12 Drawing Sheets

(56) References Cited

OTHER PUBLICATIONS

Henry, P., et al., "RGB-D Mapping: Using Depth Cameras for Dense 3D Modeling of Indoor Environments", International Symposium on Experimental Robotics, 2010.

Endres, F., et al. "An Evaluation of the RGB-D SLAM System", Proc. of the IEEE Int. Conf. on Robotics and Automation (ICRA), 2012.

Huang, A., et al. "Visual Odometry and Mapping for Autonomous Flight Using an RGB-D Camera", Proceedings of the International Symposium of Robotics Research (ISRR), Flagstaff, AZ, 2011.

Newcombe, R., et al., "KinectFusion: Real-Time Dense Surface Mapping and Tracking", IEEE ISMAR, IEEE, Oct. 2011.

Lowe, D., et al., "Distinctive image features from scale-invariant keypoints", International Journal of Computer Vision, 60, 2 (2004).

Bay, H., et al., "SURF: Speeded Up Robust Features", Computer Vision and Image Understanding (CVIU), 2008, vol. 110, No. 3, pp. 346-359.

Hebert, M., et al.,"A spherical representation for recognition of free-form surfaces", IEEE Transactions on Pattern Analysis and Machine Intelligence, 1995, 17(7), pp. 681-690.

Radu, R., et al., "Fast 3D Recognition and Pose Using the Viewpoint Feature Histogram", Proceedings of the 23rd IEEE/RSJ International Conference on Intelligent Robots and Systems (IROS), 2010.

Mian, A., et al., "On the Repeatability and Quality of Keypoints for Local Feature-based 3D Object Retrieval from Cluttered Scenes", International Journal of Computer Vision, 2010.

Wu, C., et al., "3D Model Matching with Viewpoint-Invariant Patches (VIP)", CVPR 2008.

Koser, K., et al., "Perspectively Invariant Normal Features", International Conference on Computer Vision, 2007.

* cited by examiner

METHOD FOR CREATING 3-D MODELS BY STITCHING MULTIPLE PARTIAL 3-D MODELS

BACKGROUND

1. Technical Field

Aspects of the example embodiments are directed to 3-D model creations and more specifically, 3-D model creation by stitching together multiple partial 3-D models.

2. Description of Related Art

Recently, a variety of devices have emerged that can capture 3-D structures, such as laser/lidar sensors, stereo cameras, and low-cost consumer RGB-depth cameras, such as the MICROSOFT KINECT. These devices are able to capture 3-D structures in their field of view in the form of point clouds or depth maps. Such devices have greatly reduced the effort required to capture 3-D structures. However, while these devices are able to capture 3-D structures from a single viewpoint, these devices typically do not provide a method to capture 3-D from multiple viewpoints and/or locations.

Further, services utilizing 3-D models, such as GOOGLE EARTH and APPLE MAPS, are becoming increasingly popular. Uses for 3-D models can include navigation, site promotion, and virtual or mirrored reality. In order to provide such services, there needs to be a method to create a 3-D model that represents the physical environment. Traditionally, 3-D models were created manually, which was time consuming and costly. Therefore, there may be a need to automate the process of model creation.

SUMMARY

This application relates to a method to automatically create full 3-D models by stitching together partial 3-D models captured from multiple viewpoints and locations. Such partial 3-D models can come from any of the above mentioned sources, in raw or processed form. An exemplary method stitches partial 3-D models by estimating relative transformations between partial 3-D models and applying transformations to partial models to stitch them into a full 3-D model. The relative transformations can be estimated from feature matches, which may be found using 2-D image features. Throughout the present application, the terms 3-D models and 3-D partial models may refer to 3-D structures represented as point clouds, meshes, or volumetric structures.

Aspects of certain example embodiments include a method of creating a 3-D model by combining multiple partial 3-D models, each partial 3-D model comprising a sequence of 2-D images, each 2-D image associated with 3-D coordinates mapped onto the 3-D model, the method including analyzing each of at least three partial 3-D models to identify image features in the sequence of 2-D images of each of the partial 3-D models, identifying pairs of overlapping image features between the 2-D images of each of the partial 3-D models by identifying image features in each 2-D image in the sequence of 2-D images of each of the partial 3-D model that overlaps or matches image features in 2-D images of the sequence of 2-D images of the other partial 3-D models and selecting a 2-D image from each of the partial 3-D models, computing an initial global transformation between 3-D coordinates of individual pairs of the identified overlapping image features between the selected 2-D image from each of the at least three partial 3-D models, and generating a final 3-D model based on the initial global transformation.

Aspects of certain example embodiments include a computer-readable medium having stored therein executable instructions for performing a method of creating a 3-D Model by combining multiple partial 3-D models, each partial 3-D model comprising a sequence of 2-D images, each 2-D image associated with 3-D coordinates mapped onto the 3-D model, the method including analyzing each of at least three partial 3-D models to identify image features in the sequence of 2-D images of each of the partial 3-D models, identifying pairs of overlapping image features between the 2-D images of each of the partial 3-D models by identifying image features in each 2-D image in the sequence of 2-D images of each of the partial 3-D models that overlaps or matches image features in 2-D images of the sequence of 2-D images of the other partial 3-D models and selecting a 2-D image from each of the partial 3-D models, computing an initial global transformation between 3-D coordinates of individual pairs of the identified overlapping image features between the selected 2-D image from each of the at least three partial 3-D models; and generating a final 3-D model based on the initial global transformation.

Aspects of certain example embodiments include an apparatus for creating a 3-D Model by combining multiple partial 3-D models, each partial 3-D model comprising a sequence of 2-D images, each 2-D image associated with 3-D coordinates mapped onto the 3-D model, the apparatus including an image feature analyzer that analyzes each of at least three partial 3-D models to identify image features in the sequence of 2-D images of each of the partial 3-D models, an overlapping image feature identification device that identifies pairs of overlapping image features between the 2-D images of each of the partial 3-D models by identifying image features in each 2-D image in the sequence of 2-D images of each of the partial 3-D models that overlaps or matches image features in 2-D images of the sequence of 2-D images of the other partial 3-D models and selecting a 2-D image from each of the partial 3-D models, a controller configured to compute an initial global transformation between 3-D coordinates of individual pairs of the identified overlapping image features between the selected 2-D image from each of the at least three partial 3-D models, and a display to display a final 3-D model generated based on the initial global transformation.

Aspects of certain example embodiments include a method of providing a viewable 3-D model, the method including receiving a plurality of 2-D images, each encoded with associated 3-D coordinates in a 3-D space, analyzing each of the plurality of 2-D images to identify image features in each of the plurality of 2-D images, identifying pairs of overlapping image features between the 2-D images of each of the partial 3-D models by identifying image features in each 2-D image in the sequence of 2-D images of each of the partial 3-D models that overlaps or matches image features in 2-D images of the sequence of 2-D images of the other partial 3-D models and selecting a 2-D image from each of the partial 3-D models, computing, by a processor, an initial global transformation between 3-D coordinates of individual pairs of the identified overlapping image features between the selected 2-D image from each of the at least three partial 3-D models, and providing the final 3-D model in a browsable format based on the initial global transformation.

BRIEF DESCRIPTION OF THE DRAWINGS

The accompanying drawings, which are incorporated in and constitute a part of this specification, exemplify the example embodiments and, together with the description, serve to explain and illustrate principles. Specifically.

DETAILED DESCRIPTION

Figure 1:
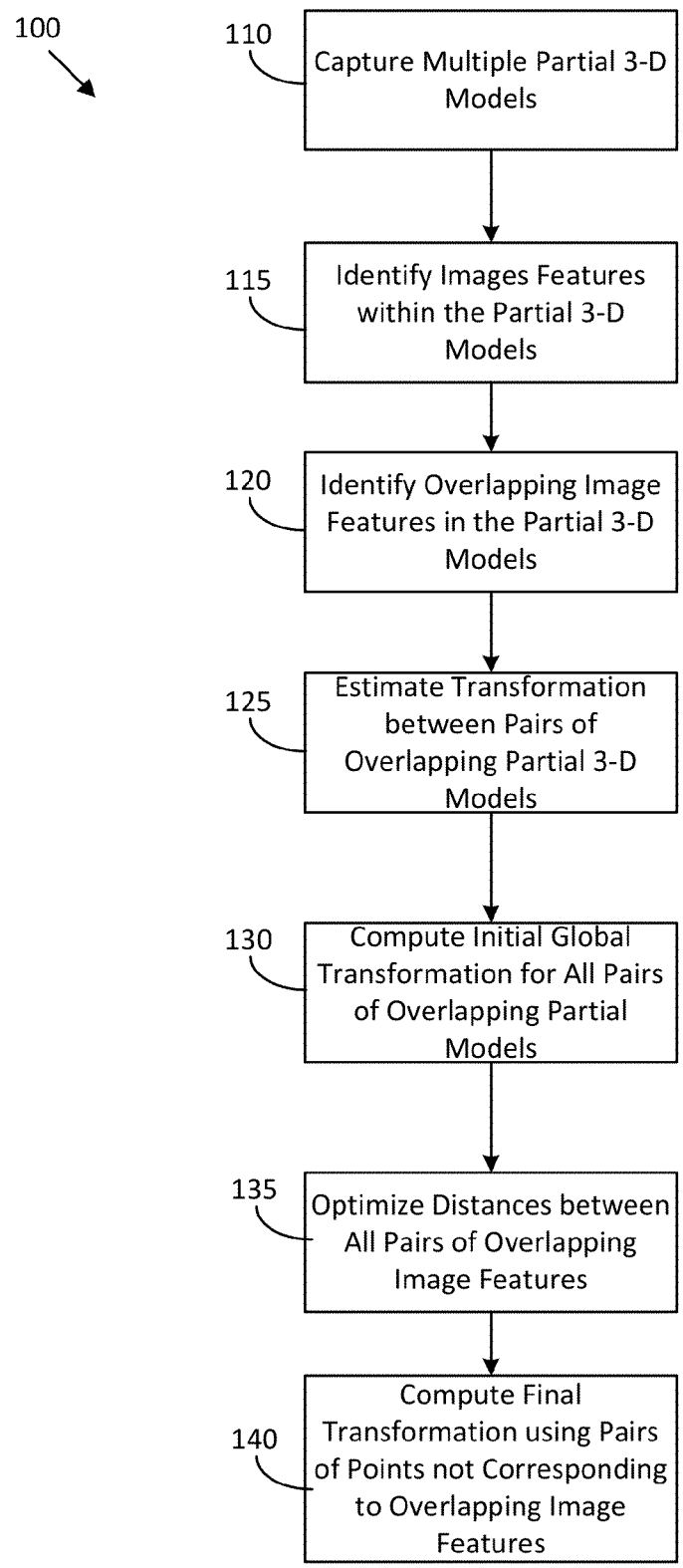
FIG. 1 illustrates a method of creating a 3-D model by stitching multiple partial 3-D models according to an example embodiment.

In the following detailed description, reference will be made to the accompanying drawing(s), in which identical functional elements are designated with like numerals. The aforementioned accompanying drawings show by way of illustration and not by way of limitation, specific embodiments and implementations consistent with principles of an example embodiment. These implementations are described in sufficient detail to enable those skilled in the art to practice an example embodiment and it is to be understood that other implementations may be utilized and that structural changes and/or substitutions of various elements may be made without departing from the scope and spirit of an example embodiment. The following detailed description is, therefore, not to be construed in a limited sense. Additionally, the various embodiments of the invention as described may be implemented in the form of software running on a general purpose computer, in the form of a specialized hardware, or combination of software and hardware.

In this application, an example method and apparatus for providing a 3-D model by stitching together multiple, unordered partial 3-D models are described. Thus, as an initial matter multiple, unordered partial 3-D models are captured or received from a 3-D model input source. The present method is not particularly limited to a specific type of 3-D input source and may handle a 3-D model from various sources. Examples of the possible sources of inputs include, but are not limited to:

Laser/Lidar sensor with optional calibrated camera: Lidar sensors provide the accurate and reliable 3-D point cloud measurements. They can capture 3-D structures that are spaced a long distance from the device with high accuracy, which can enable use as a 3-D model source in large environments. Laser/Lidar Sensors can also capture a large variety of surfaces, such as textureless surfaces, if the surfaces are not highly reflective. Additionally, a calibrated camera can be used to allow feature matches from images. However, this type of sensor can be expensive and bulky.

Stereo camera: Compared to laser/lidar sensors, stereo cameras are cheaper and less bulky. The accuracy of 3-D measurements of stereo cameras depends on a baseline distance between two cameras. However, stereo cameras may have difficult capturing textureless surfaces, such as a white wall, because they do not have image features to use for correspondence.

Consumer depth camera: Recently, consumer depth cameras, such as the MICROSOFT KINECT, which combine an image capture sensor with a depth sensor to simultaneously capture depth images along with RGB images, have become available for consumer use for use as gaming or computer user interface devices. While depth sensors which use time-of-flight or structured light techniques to infer depth have existed in the past, the cost of these systems has been prohibitively high for consumer use until recently.

Other sources of 3-D and image measurements: Additionally any other sources of 3-D and image measurements can be used as input source in the present application. For example, Inventors have experimented using processed input from a camera using the real-time surface mapping and tracking techniques. For example, techniques similar to those discussed in Newcombe et al., *KinectFusion: Real-Time Dense Surface Mapping and Tracking*, in IEEE ISMAR, IEEE, October 2011 (the contents of which are incorporated herein). This method involves tracking small movements of the camera and smoothing the depth image. The resulting smoothed 3-D point cloud and associated images can be used as input in an example embodiment of the present application. Of course any other processing technique of processing an image captured from a camera to generate a partial 3-D may be used as would be apparent to a person or ordinary skill in the art.

Further, in addition to the above discussed 3-D measurement sources, a sequence of calibrated 2-D images sequence could also be used as a source of a partial 3-D model. As used herein a "calibrated 2-D image sequence" means a sequence of 2-dimensional images that that for any given point in the 2-D images, a 3-D position has been encoded from a 3-D measurement source.

Method

FIG. 1 illustrates a method 100 of creating a 3-D model by stitching multiple partial 3-D models according to an example embodiment. An example embodiment may include software running on a personal computer. However, an example embodiment is not particularly limited to software running on a personal computer may alternatively include an application running on a mobile device, software running on a server or any other computing device or any combination with a mobile device or may be embodied as hardware.

Capturing Multiple Partial 3-D Models

In the example method 100 of FIG. 1, multiple partial 3-D models of an environment are captured in 110. The partial 3-D models may be collected from one or more sources discussed above or any other 3-D model source as would be apparent to a person of ordinary skill in the art. Each partial 3-D model includes one or more associated 2-D or 3-D images. In other words, each partial 3-D model includes a 3-D structure represented as point clouds, meshes, or volumetric structures and 2-D image information from one or more images associated with 3-D coordinates within the partial 3-D model so that the 2-D image information can be overlaid on top of the 3-D structure.

Figure 2:
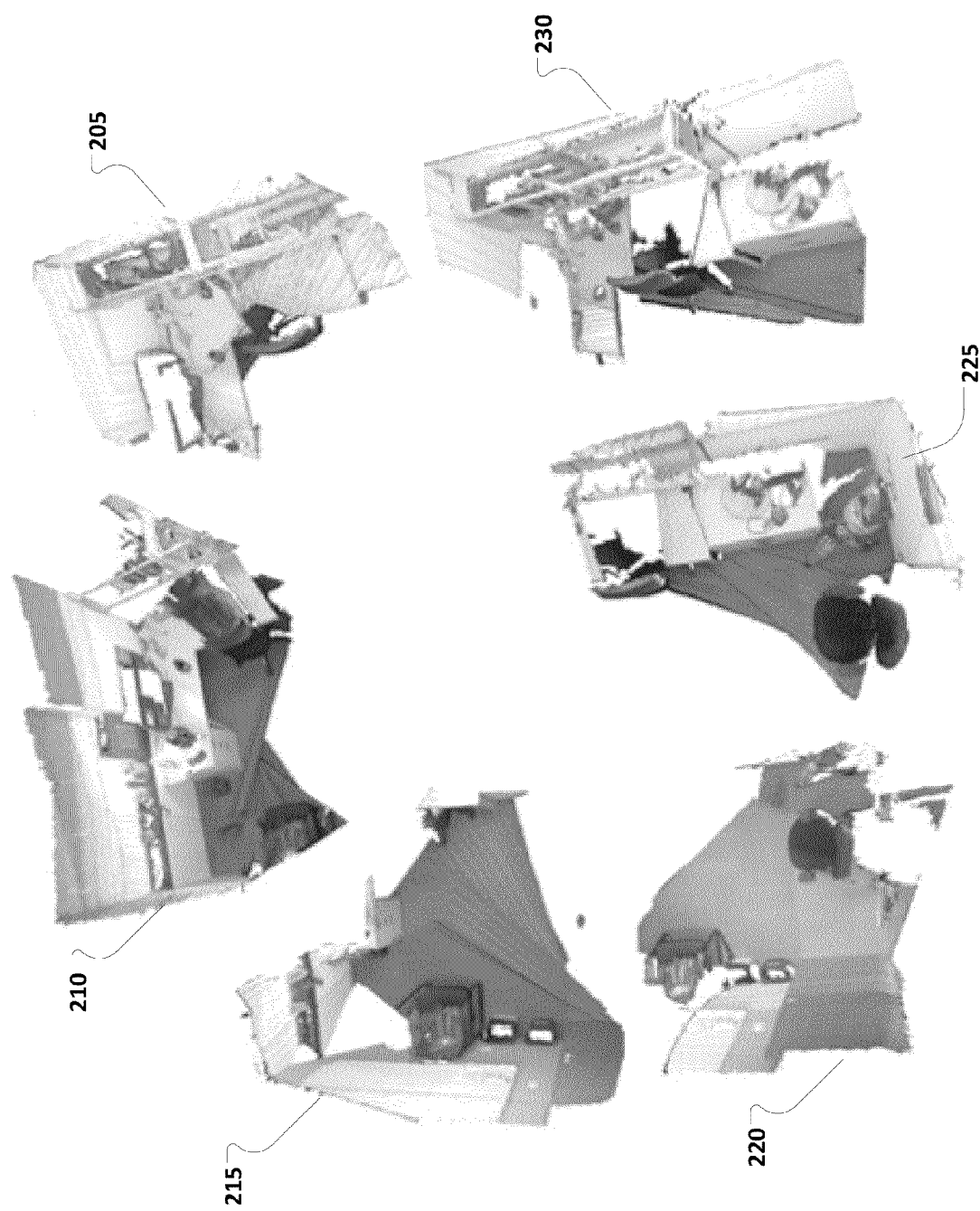
FIG. 2. illustrates an example of six partial models of a room that were captured using a depth camera.

FIG. 2 shows an example of six partial models (205, 210, 215, 220, 225, 230) of a room that were captured using a depth camera. In this embodiment, the six partial models have also been preprocessed using the real-time surface mapping and tracking techniques, such as those discussed in Newcombe et al. In this embodiment, no assumptions about the relative placement between the partial models were made or required.

Identify Image Features within the Partial 3-D Models and Find Overlapping Pairwise Image Matches Between Partial 3-D Models After the multiple partial 3-D models are captured in 110, each partial 3-D model is processed to identify image features in 115. As discussed above, each partial 3-D model includes one or more associated 2-D images. In 115, each of the 2-D images associated with the each of the partial 3-D models is processed using one or more image recognition techniques to identify objects and features of the image. For example, each of the images associated with each of the partial 3-D models may be analyzed using a Scale-Invariant Feature Transform (SIFT) image recognition process to identify features of each of the images. Other methods of analysis may be used in 115.

Once each of the images associated with each of the partial 3-D models has been processed to identify image features in 115, image features identified in one of the partial 3-D models (205, for example), which overlap or match features identified in another of the partial 3-D models (210, for example) are identified as overlapping image features in 120. In other words, the image or images associated with each of a pair of partial models (205 and 210) are analyzed to determine if features match or overlap. Thus, features within each of the images of one of the partial 3-D models that are common to one or more images of another of the partial 3-D models are identified as the overlapping features.

Figure 3A:
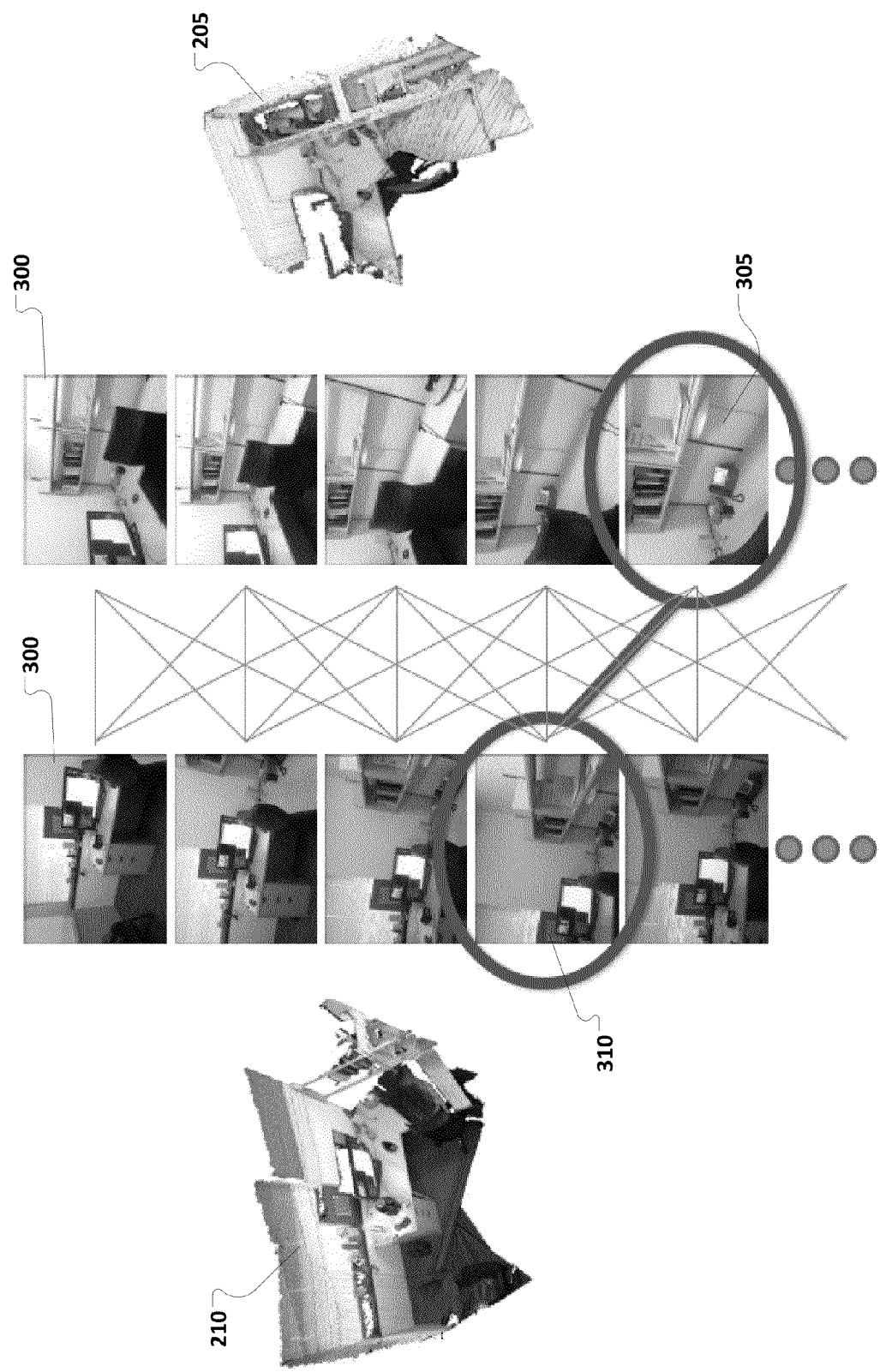
FIG. 3A shows a comparison between a sequence of images making up a first partial model to a sequence of images making up a second partial model according to an example embodiment.

FIG. 3A shows a comparison between a sequence of images making up partial model 205 to a sequence of images making up partial model 210 according to an embodiment of the present application. As shown, each partial model (205, 210) includes a sequence of 2-D images 300 that can me overlaid onto a 3-D space representing the partial model. Based on the image features identified in 115, the sequence of images 300 associated with the partial model (205, 210) to identify any images that include overlapping image features in 120. If multiple images in each sequence of images 300 are determined to include overlapping features, images (305, 310) that have the most overlapping features may be selected from each of the partial models 205, 210.

Once common features have been identified between images of different partial 3-D models, the 3-Dimensional coordinates of the images within the partial 3-D models is analyzed. The pair of partial models (205 and 210) are identified as being overlapping partial 3-D models, when images 305, 310 associated with each partial model (205, 210) contain one or more matching image features and a large enough spread such that features are not collinear or coplanar is determined. This spread is quantified by a measure as discussed below. Further, if the partial models have more than one associated image, there are several pairs of images from the pair of partial models (205, 210) that have a sufficient number of matching image features, one pair of images which best constrains the relative pose is chosen.

The spread between the features and constraint of the relative pose is determined by performing Principal Component Analysis (PCA) on the 3-D coordinates of matching image features within each of the partial 3-D models. Then, the pair of image features which has the largest smallest (3rd) eigenvalue, based on a covariance matrix of the 3-D coordinates associated with the image features, is selected as the image features to be used in subsequent analysis discussed above. As mentioned above, this may prevent the features from being collinear or coplanar, which does not adequately constrain the relative pose.

In this embodiment, one image is selected from each of partial 3-D models as the best overlapping image pairs, and is used for the subsequent analysis discussed above. However, embodiments of the present application need not use only one image selected from each of the partial 3-D models, and instead may use more than one image selected from each of the partial 3-D models.

Overlapping partial 3-D models have been identified, the transformation relating the two partial 3-D models can be estimated. Specifically, the transformation that minimizes a 3-D Euclidean distance between corresponding or matching image features using Random Sample Consensus (RANSAC) procrustes analysis.

Figure 3B:
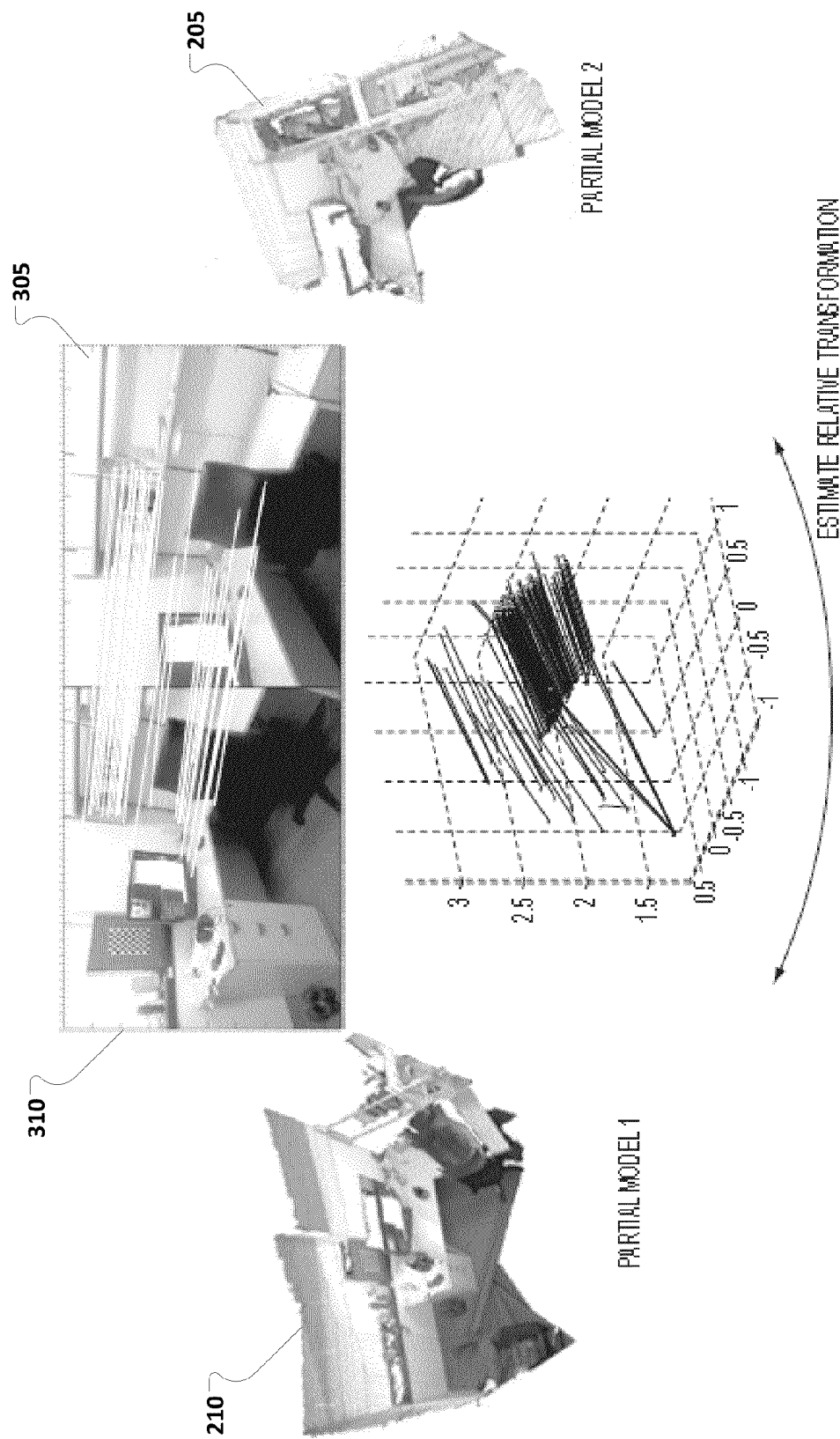
FIG. 3B illustrates an example of feature correspondences found between two partial models using SIFT image features identified in the images.

FIG. 3B shows an example of feature correspondences that were found between two partial models 205, 210 using SIFT image features identified in images 305, 310, which correspond to the partial models 205, 210 respective. A relative transformation (rotation and translation) between two models 205, 210 can be computed using the features of the images 305, 310, which are identified as matching or overlapping.

Compute Initial Global Transformation for Individual Pairs of Partial Models

Figure 4A:
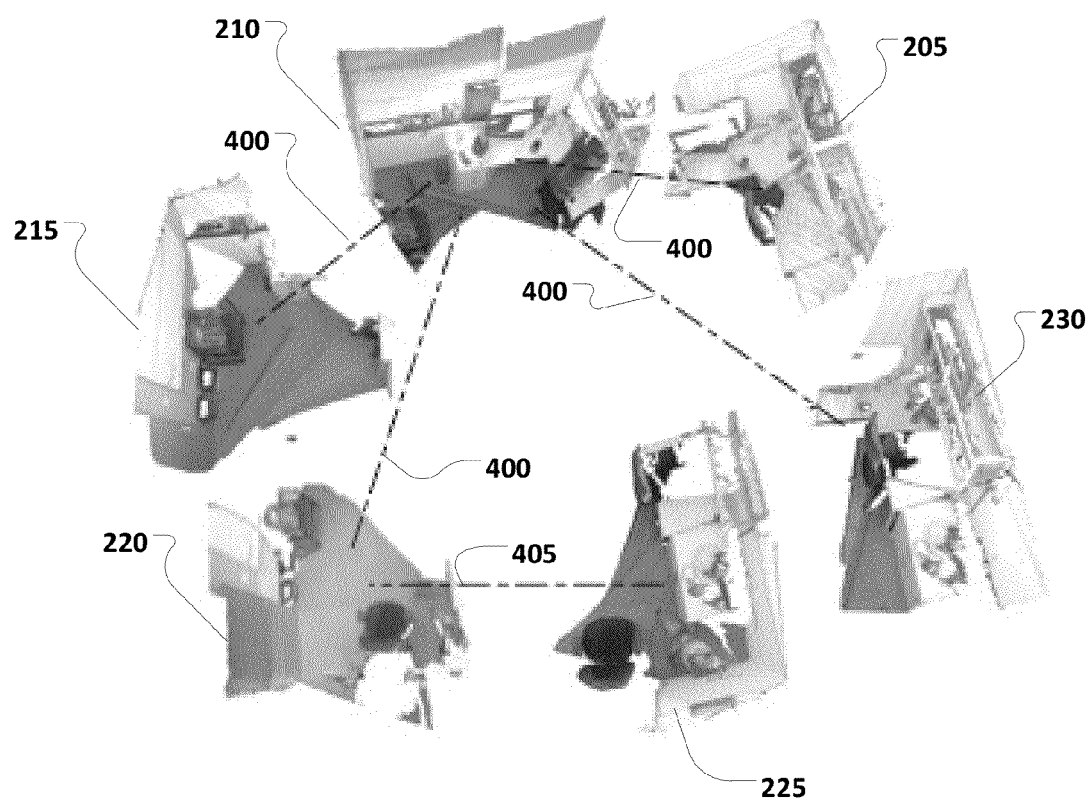
FIG. 4A illustrates an initial global transformation computed as an initial estimate by propagating pairwise transformations along a spanning tree approach.

Once transformations for all pairs of overlapping partial models (205, 210, 215, 220, 225, 230) are estimated in 125, an initial global transformation for the whole set of partial models (205, 210, 215, 220, 225, 230) is calculated in 130. FIG. 4A shows an initial global transformation computed as an initial estimate by propagating pairwise transformations along a spanning tree approach. In other words, the partial models (205, 210, 215, 220, 225, 230) are arranged such that connections 400, 405 are established between overlapping partial models by attempting to connect each of the partial through a single model, which can function as a "trunk" to which as many other models can be connected as "branches".

Thus, the set of partial models (205, 210, 215, 220, 225, 230) is analyzed to determine which partial model overlaps with the most other partial models. As shown in the example embodiment in FIG. 4A, partial model 210 overlapped with four of the other partial models (205, 215, 220, 230) and thus is selected as the "trunk" of the spanning tree. The four partial models (205, 215, 220, 230), which overlap with partial model 210, are arranged with respect to the partial model 210 based on the estimated transformations calculated in 125 and connections 400 to the "trunk" partial model 210 are established. Further, once the "branch" partial models (205, 215, 220, 230), which overlap the "trunk" partial model 210, are arranged, any partial model (225) that does not overlap the "trunk" partial model 210, but overlaps one of the "branch" partial models is arranged with respect to the "branch" partial model 220 to which it overlaps and a connection 405 there between is established. Thus, an initial pose or arrangement of the partial models (205, 210, 215, 220, 225, 230) is created. By using a spanning tree approach as discussed above, global transformation of the partial models can be computed by compounding pairwise transforms along the edges of the spanning tree.

Refine Global Transformation by Optimizing Image Feature Correspondences

Figure 4B:
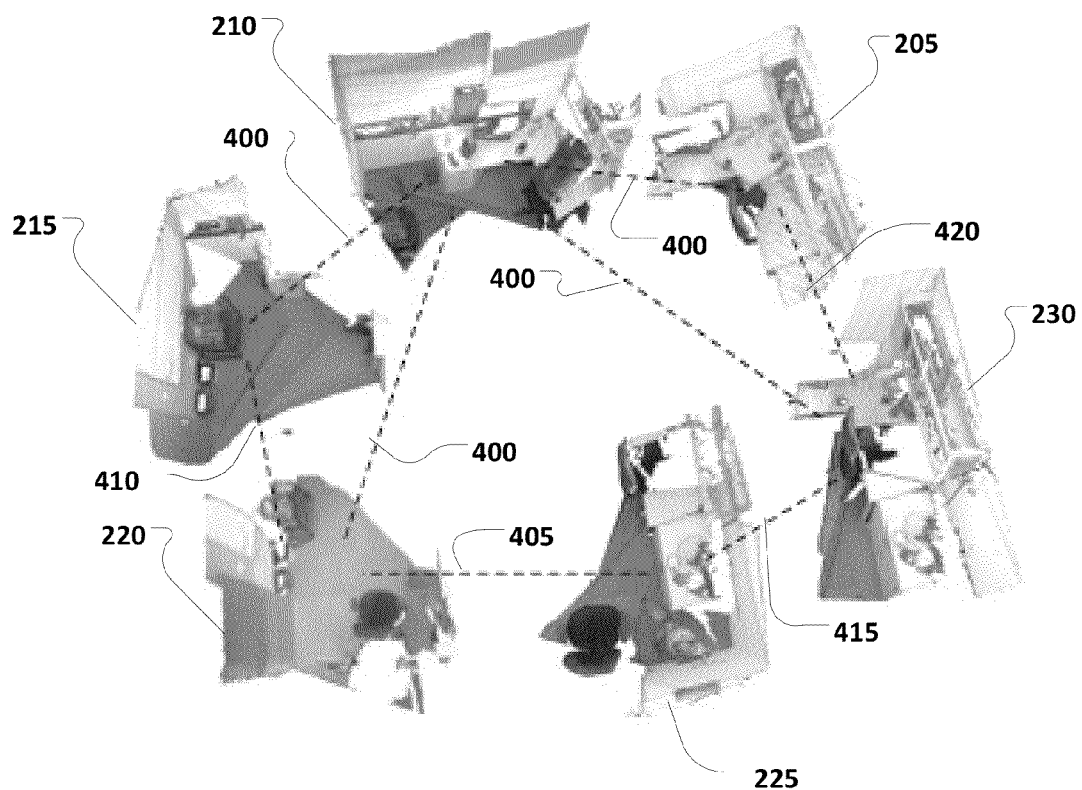
FIG. 4B illustrates an example embodiment showing the connections between all pairs of overlapping partial models.

Once the initial global transformation is calculated in 130 to create the initial pose or arrangement as shown in FIG. 4A, the global transformation is refined in 135 using all of the overlapping image features among all pairs of overlapping partial models. FIG. 4B shows an example embodiment showing the connections (400, 405, 410, 415, 420) between all pairs of overlapping partial models (205, 210, 215, 220, 225, 230). Specifically, connections 410, 415, and 420 are established between partial models 215, 220, 225, 230, and 205, which were not connected using the spanning tree approach in 130 once the initial pose or arrangement is determined. Further, the initial Global transformations are refined by running a global optimization routine that minimizes the sum of all distances (i.e. connections 400, 405, 410, 415, 420) between overlapping image features of all of the partial models (205, 210, 215, 220, 225, 230) by minimizing the function:

$$\min_{R,t} \sum_{(u,v)\in pair} \sum_{(i,j)\in match_{u,v}} ((R_u x_{u,i} + t_u) - (R_v x_{v,j} + t_v))^2, \quad \text{Eq. 1}$$

where (u, v) denotes a pair of overlapping partial models with feature correspondences, (i, j) denotes a pair of feature correspondences, $x_{u,i}$ denotes the 3-D coordinate of a feature i of partial model u, $R_u$ denotes the global rotation of partial model u and $t_u$ denotes translation of partial model u. In some embodiments, the rotation matrix is represented as a three dimensional vector using the Rodrigues' formula in order to keep the rotation parameter as a valid rotation in rotation Group so(3) during optimization. This may allow a general purpose unconstrained optimization package may be used.

In the above discussed embodiment, the initial global transformation was refined using all pairs of overlapping features in all of the partial 3-D models. However, an example embodiment of the present application need not use all pairs of overlapping features to refine the initial global transformation. Instead, an example embodiment may refine the initial global transformation using as few as 3 pairs of overlapping features in the partial 3-D models. Using at least 3 pairs of overlapping features allows the rotation of 3-D coordinates to be prevented.

Figure 5A:
FIG. 5A illustrates a 3-D model created using only the spanning tree approach.
Figure 5B:
FIG. 5B illustrates a 3-D model created using both the spanning tree approach and subsequent global optimization.

FIG. 5A shows a 3-D model created using only the spanning tree approach discussed above in 130. FIG. 5B shows a 3-D model created after performing the global optimization in 135.

Compute Final Global Transformation and Create the Final 3-D Model

After the initial global transformation is refined in 135, the global transformations can be further refined in 140 using pairs of points of the overlapping partial models, which do not correspond to overlapping image features. Specifically, the global transformations may be further refined by using Iterative Closest Points (ICP) analysis on corresponding points of the partial models that do not correspond with previously identified overlapping image features. In some embodiments, ICP analysis may be performed on all corresponding points of the partial models. By using more corresponding points (i.e. points not associated with overlapping image features or all points of the partial models) improved alignment of the final model may be achieved.

In embodiments where point clouds are used to represent the individual partial 3-D models, all point clouds can be put together into a single coordinate system using the calculated final global transformation to generate or create the final model. Additionally, in some embodiments, an optional down sampling method may be run to reduce the point density when desired.

In embodiments where meshes or other volumetric structures are used to represent the individual partial 3-D models, additional processing may be performed on the partial 3-D models to create the final model. For example, the image information associated with the individual partial 3-D models may be re-meshed to smooth the collected partial models into a single final model.

Figure 6A:
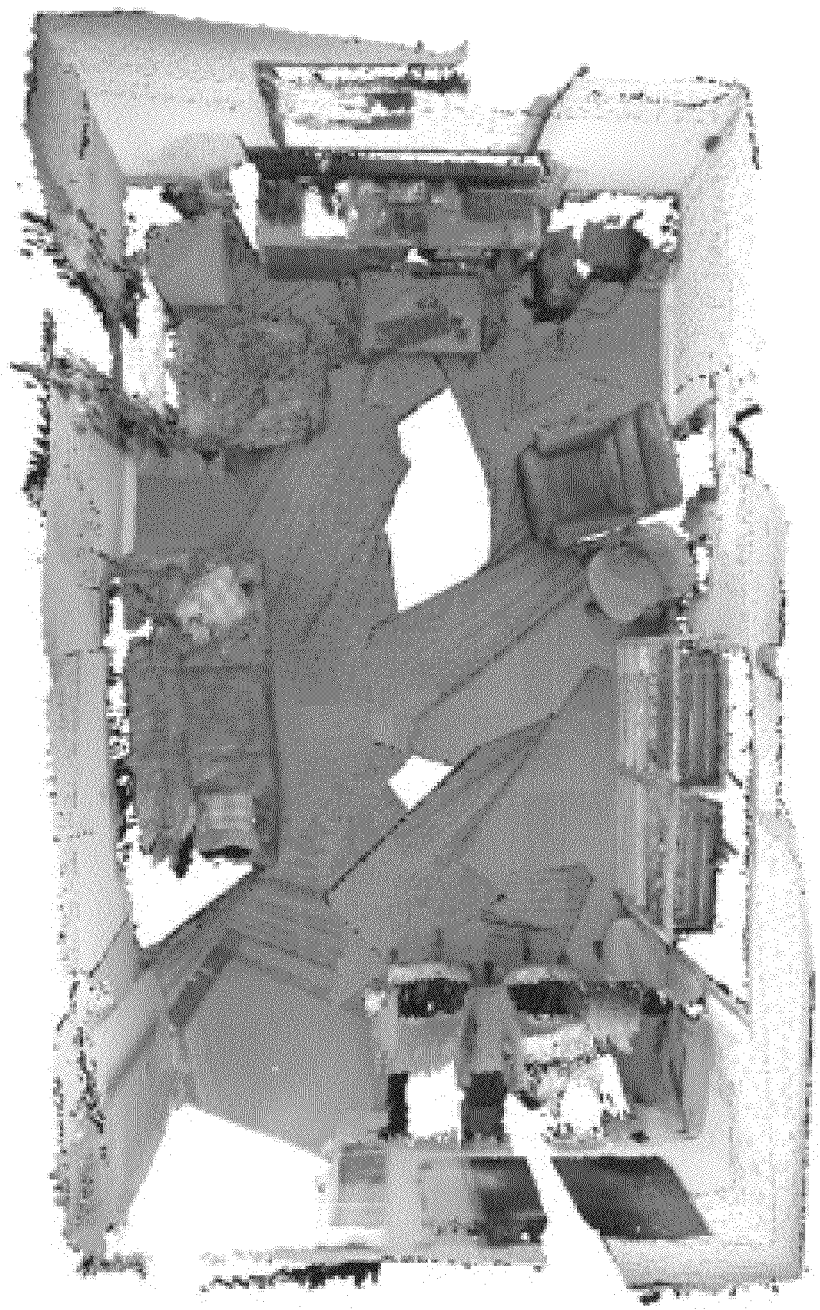
FIG. 6A illustrates a model stitched together from 10 partial models.
Figure 6B:
FIG. 6B illustrates a model stitched together from 14 partial models.

In the above embodiment, 6 partial models are used to create the final 3-D model. However, an embodiment of the present application is not limited to using 6 partial models and can include any number of models. For Example, FIG. 6A shows a model stitched together from 10 partial models and FIG. 6B shows a model stitched together from 14 partial models.

Once the final 3-D model is generated based on the final global transformation, the use of the final 3-D model is not particularly limited. For Example, the Final 3-D model may be displayed on a 3-Dimensional image display device. Alternatively, the final 3-D model may be provided to consumers in a browsable digital format.

Example Computing Devices and Environments

Figure 7:
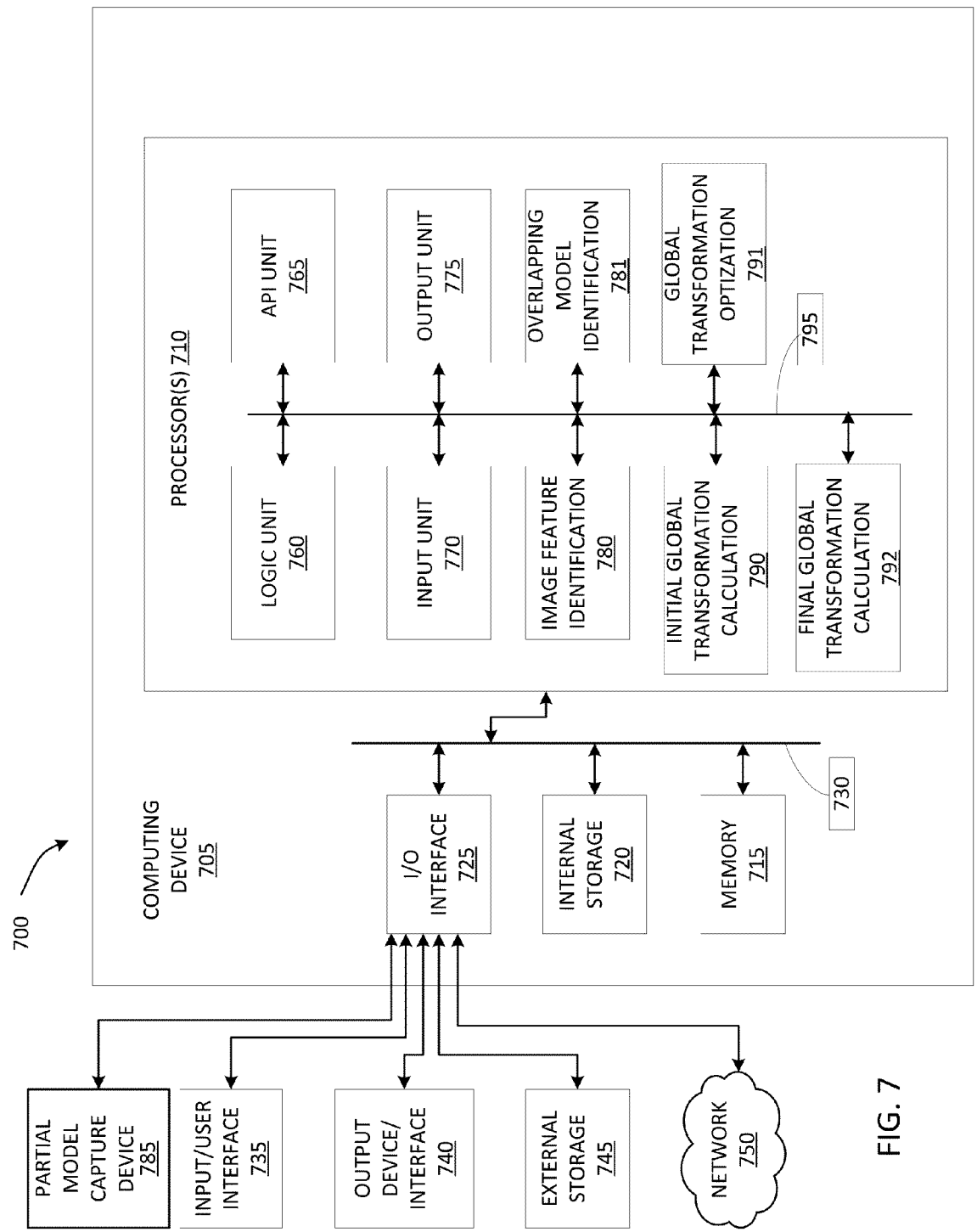
FIG. 7 shows an example computing environment with an example computing device suitable for implementing at least one example embodiment.

FIG. 7 shows an example computing environment with an example computing device suitable for implementing at least one example embodiment. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and I/O interface 725, all of which can be coupled on a communication mechanism or bus 730 for communicating information.

Computing device 705 can be communicatively coupled to input/user interface 735, output device/interface 740, and a partial model image capture device 785. Either one or all of the input/user interface 735, output device/interface 740, or partial model image capture device 785 can be wired or wireless connected and can be detachable. The Input/user interface 735 may include any device, component, sensor, or interface, physical or virtual, that can be used to provide input (e.g., keyboard, a pointing/cursor control (e.g. a mouse), microphone, camera, braille, motion sensor, optical reader, and/or the like). Output device/interface 740 may include a display, monitor, printer, speaker, braille, or the like. The partial model image capture device 785 may include any device, component, or sensor that can be used to capture a 3-D model as discussed above. In some example embodiments, input/user interface 735 and output device/interface 740 can be embedded with or physically coupled to the computing device 705 (e.g., a mobile computing device with buttons or touch-screen input/user interface and an output or printing display, or a television). Additionally, in some example embodiments, a partial model image capture device 785 may also be embedded with or physically coupled to the computing device 705 (e.g. a mobile computing device with an integrated camera).

Computing device 705 can be communicatively coupled to external storage 745 and network 750 for communicating with any number of networked components, devices, and systems, including one or more computing devices of same or different configuration. Computing device 705 or any connected computing device can be functioning as, providing services of, or referred to as a server, client, thin server, general machine, special-purpose machine, or by other label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions to implement at least one embodiment (e.g., a described embodiment). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. To implement a described embodiment, one or more applications can be deployed that include logic unit 760, application programming interface (API) unit 765, input unit 770, output unit 775, image feature identification unit 780, overlapping model identification unit 781, initial global transformation calculation unit 790, global transformation optimization 791, final global transformation calculation unit 792, and inter-unit communication mechanism 795 for the different units to communicate with each other, with the OS, and with other applications (not shown). For example, the image feature identification unit 780, overlapping model identification unit 781, initial global transformation calculation unit 790, global transformation optimization 791, final global transformation calculation unit 792 may implement one or more processes discussed above and shown in FIG. 1. The described units and elements can be varied in design, function, configuration, or implementation and are not limited to the descriptions provided.

Hardware Implementations

Figure 8:
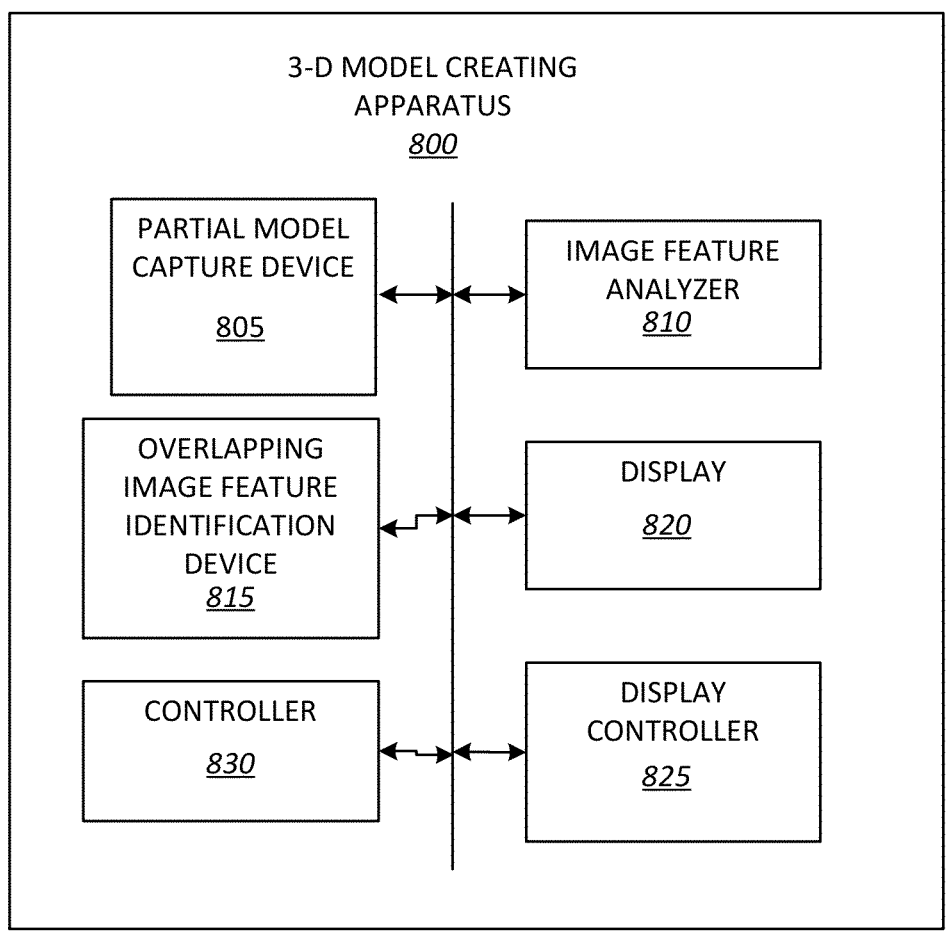
FIG. 8 illustrates an example hardware implementation of an example embodiment.

Though certain embodiments of the present invention may be implemented as software running on, for example, a mobile device, example embodiments are not limited to software implementations. FIG. 8 illustrates an example hardware implementation of an example embodiment.

In FIG. 8, a 3-D model creating apparatus 800 is shown. The 3-D model creating apparatus 800 includes a partial model capture device 805, image feature analyzer 810, Image identification device 815, display 820, controller 830, and display controller 825. The partial model capture device 805 may capture multiple partial 3-D models and may be any 3-D source as discussed above. Further, the image feature analyzer 810 may analyze the images making up the 3-D models to detect the image features using the processes discussed above with respect to FIG. 1. Similarly, the overlapping image feature identification device 815 may identify image features in the partial 3-D models that overlap image features in other partial 3-D models using the processes discussed above with respect to FIG. 1.

Additionally, the controller 830 that may estimate a relative transformation between overlapping image features of the partial 3-D models, computes an initial global transformation between the partial 3-D models using a spanning tree, refine the initial global transformation by optimizing distances between all pairs of overlapping image features, and compute a final global transformation using processes discussed above with respect to FIG. 1. Additionally, the display controller 825 may control the display 820 to display a final 3-D model generated based on the final global transformation. The display 820 is not particularly limited and could include, but is not limited to, a LCD display, an LED display, a Plasma display, and Cathode ray display, etc., as would be apparent to a person of ordinary skill in the art.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents.

Aspects related to the example embodiment have been set forth in part in the description above, and in part should be apparent from the description, or may be learned by practice of the invention. Aspects of the example embodiment may be realized and attained by means of the elements and combinations of various elements and aspects particularly pointed out in the following detailed description and the appended claims.

It is to be understood that both the foregoing descriptions are exemplary and explanatory only and are not intended to be limiting.

What is claimed is:

1. A method of creating a 3-D model by combining multiple partial 3-D models, each partial 3-D model comprising a sequence of 2-D images, each 2-D image associated with 3-D coordinates mapped onto the 3-D model, the method comprising:

analyzing each of at least three partial 3-D models to identify image features in the sequence of 2-D images extracted from each of the partial 3-D models;

identifying pairs of overlapping image features between the 2-D images extracted from each of the partial 3-D models by identifying image features in each 2-D image in the sequence of 2-D images extracted from each of the partial 3-D model that overlaps or matches image features in 2-D images of the sequence of 2-D images of the other partial 3-D models and selecting a 2-D image from each of the partial 3-D models;

computing an initial global transformation between 3-D coordinates of individual pairs of the identified overlapping image features between the selected 2-D image from each of the at least three partial 3-D models; and generating a final 3-D model based on the initial global transformation.

2. The method according to claim 1, wherein the initial global transformation is computed using a spanning tree to propagate transformations between the overlapping pairs of the at least three partial 3-D models to establish connections between the at least three partial models through a single partial 3-D model that overlaps with a largest number of the other partial 3-D models.

3. The method according to claim 1, wherein the initial global transformation is refined by optimizing distances between the 3-D coordinates associated with all corresponding pairs of identified overlapping image features across all of the at least three partial 3-D models.

4. The method according to claim 1, wherein the generating a final 3-D model comprises:
refining, the initial global transformation by optimizing distances between the 3-D coordinates associated with at least 3 pairs of identified overlapping features extracted across all of the at least three partial 3-D models;
computing a final global transformation using iterative analysis to minimize the distance between at least one pair of points in at least two of the partial 3-D models, the pair of points not corresponding to an identified pair of overlapping image features; and
generating the final 3-D model based on the final global transformation.

5. The method according to claim 4, wherein the computing the final global transformation comprises performing iterative closest points analysis on all points of the at least three partial 3-D models.

6. The method according to claim 4, wherein the refining the initial global transformation comprises minimizing the function:

$$\min_{R,t} \sum_{(u,v) \in pair} \sum_{(i,j) \in match_{u,v}} ((R_u x_{u,i} + t_u) - (R_v x_{v,j} + t_v))^2$$

Where:
(u, v) denotes the at least two partial 3-D models having overlapping features,
(i, j) denotes a pair of overlapping features,
$x_{u,i}$ denotes the 3-D coordinate of image feature i of partial model u,
$R_u$ denotes the global rotation of partial model u, and
$t_u$ denotes the global translation of partial model u.

7. The method according to claim 1, wherein the identifying pairs of image features from the sequence of 2-D images of each the partial 3-D models comprises performing principal component analysis on the 3-D coordinates of image features identified as matching between the two or more partial 3-D models.

8. The method according to claim 1, wherein the selecting the 2-D image from each of the partial 3-D models comprises selecting the 2-D image from the sequence of 2-D images extracted from each of the partial 3-D models, which has the largest value of the image's smallest ($3^{rd}$) eigenvalue based on a covariance matrix of the 3-D coordinates associated with the image features.

9. The method according to claim 1, wherein the identifying pairs of image features that overlap or match further comprises performing scale-invariant feature transform image recognition on each 2-D image to identify image features that appear in images of at least two of the partial 3-D models.

10. A non-transitory computer-readable medium having stored therein executable instructions for performing a method of creating a 3-D Model by combining multiple partial 3-D models, each partial 3-D model comprising a sequence of 2-D images, each 2-D image associated with 3-D coordinates mapped onto the 3-D model, the method comprising:

analyzing each of at least three partial 3-D models to identify image features in the sequence of 2-D images extracted from each of the partial 3-D models;
identifying pairs of overlapping image features between the 2-D images extracted from each of the partial 3-D models by identifying image features in each 2-D image in the sequence of 2-D images extracted from each of the partial 3-D models that overlaps or matches image features in 2-D images of the sequence of 2-D images of the other partial 3-D models and selecting a 2-D image from each of the partial 3-D models;
computing an initial global transformation between 3-D coordinates of individual pairs of the identified overlapping image features between the selected 2-D image from each of the at least three partial 3-D models; and
generating a final 3-D model based on the initial global transformation.

11. The computer readable medium according to claim 10, wherein the generating a final 3-D model comprises:
refining the initial global transformation by optimizing distances between the 3-D coordinates associated with at least 3 pairs of identified overlapping features extracted across all of the at least three partial 3-D models;
computing a final global transformation using iterative analysis to minimize the distance between at least one pair of points in at least two of the partial 3-D models, the pair of points not corresponding to an identified pair of overlapping image features; and
generating the final 3-D model based on the final global transformation.

12. The computer readable medium according to claim 10, wherein the identifying pairs of image features from the sequence of 2-D extracted from each of the partial 3-D models comprises performing principal component analysis on the 3-D coordinates of image features identified as matching between the partial 3-D models.

13. The computer readable medium according to claim 10, wherein the selecting the 2-D image comprises selecting the 2-D image from the sequence of 2-D images extracted from each of the partial 3-D models, which has the largest value of the image's smallest ($3^{rd}$) eigenvalue based on a covariance matrix of the 3-D coordinates associated with the image features.

14. The method according to claim 10, wherein the identifying pairs of image features that overlap or match further comprises performing scale-invariant feature transform image recognition on each image to identify image features that appear in 2-D images of at least two of the partial 3-D models.

15. An apparatus for creating a 3-D Model by combining multiple partial 3-D models, each partial 3-D model comprising a sequence of 2-D images, each 2-D image associated with 3-D coordinates mapped onto the 3-D model, the apparatus comprising:
at least one memory operable to store computer executable instructions;
at least one processor configured to read and execute the computer executable instructions to implement:
an image feature analyzer that analyzes each of at least three partial 3-D models to identify image features in the sequence of 2-D images extracted from each of the partial 3-D models;
an overlapping image feature identification device that identifies pairs of overlapping image features between the 2-D images extracted from each of the partial 3-D models by identifying image features in each 2-D image in the sequence of 2-D images extracted from each of the partial 3-D models that overlaps or matches image features in 2-D images of the sequence of 2-D images of the other partial 3-D models and selecting a 2-D image from each of the partial 3-D models;

a controller configured to compute an initial global transformation between 3-D coordinates of individual pairs of the identified overlapping image features between the selected 2-D image from each of the at least three partial 3-D models; and a display configured to display a final 3-D model generated based on the initial global transformation.

16. The apparatus according to claim 15, wherein the controller is configured to refine the initial global transformation by optimizing distances between the 3-D coordinates associated with at least 3 pairs of identified overlapping features extracted across all of the at least three partial 3-D models;

wherein the controller computes a final global transformation using iterative analysis to minimize distance between at least one pair of points in at least two of the partial 3-D models, the pair of points not corresponding to an identified pair of overlapping image features; and wherein the display displays the final 3-D model generated based on the final global transformation.

17. The apparatus according to claim 15, wherein the identifying pairs of image features from the sequence of 2-D images that overlap or match comprises performing principal component analysis on the 3-D coordinates of image features identified as matching between the partial 3-D models.

18. The apparatus according to claim 15, the selecting the 2-D image comprises selecting the 2-D image from the sequence of 2-D images extracted from of each of the two or more partial 3-D models which has the largest value of the image's smallest ($3^{rd}$) eigenvalue based on a covariance matrix of the 3-D coordinates associated with the image features.

19. The apparatus according to claim 15, wherein the identifying pairs of image features that overlap or match further comprises performing scale-invariant feature transform image recognition on each 2-D image to identify image features that appear in images of at least two of the partial 3-D models.

20. A method of providing a viewable 3-D model, the method comprising:

receiving a plurality of 2-D images, each encoded with associated 3-D coordinates in a 3-D space represented by partial 3-D models;

analyzing each of the plurality of 2-D images to identify image features in each of the plurality of 2-D images;

identifying pairs of overlapping image features between the 2-D images extracted from each of the partial 3-D models by identifying image features in each 2-D image in the sequence of 2-D images extracted from each of the partial 3-D models that overlaps or matches image features in 2-D images of the sequence of 2-D images of the other partial 3-D models and selecting a 2-D image from each of the partial 3-D models;

computing, by a processor, an initial global transformation between 3-D coordinates of individual pairs of the identified overlapping image features between the selected 2-D image from each of the at least three partial 3-D models; and providing the final 3-D model in a browsable format based on the initial global transformation.

21. The method according to claim 20, wherein the providing the final 3-D model comprises:

refining the initial global transformation by optimizing distances between the 3-D coordinates associated with at least 3 pairs of identified overlapping features extracted across all of the plurality of images;

computing a final global transformation using iterative analysis to minimize the distance between at least one pair of points in at least two of plurality of images, the pair of points not corresponding to an identified pair of overlapping image features to create a final 3-D model; and providing the final 3-D model in the browsable format based on the final global transformation.

* * * * *